United States Patent
Caron et al.

(10) Patent No.: US 9,552,746 B2
(45) Date of Patent: Jan. 24, 2017

(54) DEFIBRILLATING SIMULATOR

(71) Applicant: CAE HEALTHCARE CANADA INC, Saint-Laurent (CA)

(72) Inventors: François Caron, Saint-Laurent (CA); Jean-Sébastien Flamand, Saint-Laurent (CA)

(73) Assignee: CAE Healthcare Canada Inc., Saint-Laurent (CA)

(*) Notice: Subject to any disclaimer, the term of this patent is extended or adjusted under 35 U.S.C. 154(b) by 0 days.

(21) Appl. No.: 15/085,307

(22) Filed: Mar. 30, 2016

(65) Prior Publication Data
US 2016/0210883 A1 Jul. 21, 2016

(51) Int. Cl.
G09B 23/30 (2006.01)
G09B 23/28 (2006.01)
G09B 9/00 (2006.01)

(52) U.S. Cl.
CPC ............ G09B 23/288 (2013.01); G09B 9/00 (2013.01); G09B 23/30 (2013.01)

(58) Field of Classification Search
USPC ................................ 434/262, 265
See application file for complete search history.

(56) References Cited

U.S. PATENT DOCUMENTS

2013/0330698 A1    12/2013   Yang et al.
2014/0004494 A1*   1/2014    Griesser ............. A61N 1/3993
                                                                    434/267
2014/0315173 A1    10/2014   Duval-Arnould et al.

* cited by examiner

Primary Examiner — James Hull
(74) Attorney, Agent, or Firm — IP DELTA PLUS INC

(57) ABSTRACT

The present disclosure relates to a defibrillating simulator comprising an apparatus for adapting a defibrillator for training. The apparatus for adapting a defibrillator for training comprises a pair of electrode covers to be mounted on electrodes of the defibrillator for receiving an electrical discharge generated by the defibrillator. The apparatus further comprises an impedance connected to the pair of electrode covers, the impedance absorbing some of the received electrical discharge and generates an electrically reduced electrical discharge. The apparatus comprises an analyzer for analyzing the electrically reduced electrical discharge and providing analysis data representative of the electrical discharge. The defibrillating simulator further comprises a scenario unit providing a training scenario comprising physiological data. The defibrillating simulator further comprises a processing unit for correlating the analysis data with the training scenario to generate training results.

15 Claims, 3 Drawing Sheets

DEFIBRILLATING SIMULATOR

TECHNICAL FIELD

The present disclosure generally relates to defibrillating simulators for healthcare training.

BACKGROUND

Defibrillators are medical devices widely used for treatment of cardiac dysrhythmias and ventricular fibrillation. The treatment applied consists in applying an electrical current to the heart.

Defibrillators are classified as manual or automated defibrillators. Manual defibrillators are designed for medical professionals, while automated defibrillators, also called Automated External Defibrillators (AED), are designed for use by the general public.

Defibrillating simulators have been developed for training users to practice defibrillating procedures. Defibrillating simulators are typically provided with a mannequin simulating a human body and having predetermined contacts areas for receiving defibrillator electrodes (i.e. paddles and/or sticks), and receiving the electrical discharge generated by the defibrillator delivered through the electrodes. Current defibrillating simulators lack realism because of the visible contact areas and restricted defibrillator electrodes positioning on predetermined contact areas that cannot be changed for simulating different human anatomical characteristics. Moreover, current defibrillating simulators require to be used with specifically configured mannequins, thus portability between different platforms is not possible. The mannequins used in connection with defibrillating simulators are typically provided with electrical circuits mounted therein for collecting the electrical discharge delivered through the electrodes of the defibrillating simulators. Mannequins embedding additional simulated patients' functions like a breathing function and breathing movements, the visible contact areas and corresponding electrical circuits required to receive the electrical discharge generated by the defibrillating simulators lead to increased risks of electrical shocks and electronic interferences with other electrical and electronic components within the mannequin.

It would therefore be desirable to provide an improved defibrillating simulator that would reduce at least one of the above-mentioned drawbacks of current defibrillating simulators.

SUMMARY

It is an object to obviate or mitigate at least one disadvantage of previous defibrillator simulators.

It is another object to provide unrestricted defibrillator electrode positioning on a simulated body or surface to be defibrillated to improve realism of a defibrillating training.

It is another object to provide an apparatus for adapting a conventional defibrillator for training that would be usable with a defibrillating simulator.

Accordingly, there is provided a defibrillating simulator. The defibrillating simulator comprises an apparatus for adapting a defibrillator for training. The apparatus for adapting the defibrillator for training comprises a pair of electrode covers to be mounted on electrodes of the defibrillator, the pair of electrode covers receiving an electrical discharge generated by the defibrillator and delivered through the electrodes. The apparatus also comprises an impedance connected to the pair of electrode covers to receive there through the electrical discharge and absorb some of the electrical discharge to generate an electrically reduced electrical discharge. The apparatus also comprises an analyzer for analyzing the electrically reduced electrical discharge and providing analysis data representative of the electrical discharge. The defibrillating simulator further comprises a scenario unit for providing at least one training scenario comprising physiology model data. The defibrillating simulator also comprises a processing unit receiving the training scenario and the analysis data representative of the electrical discharge. The processing unit correlates the analysis data with the training scenario to provide training results. The defibrillating simulator is further provided with a display unit for displaying the physiology model data and the training results.

BRIEF DESCRIPTION OF THE DRAWINGS

Embodiments of the disclosure will be described by way of example only with reference to the accompanying drawings, in which like numerals represent like parts.

DETAILED DESCRIPTION

The foregoing and other features will become more apparent upon reading of the following non-restrictive description of illustrative embodiments thereof, given by way of example only with reference to the accompanying drawings. Various aspects of the present disclosure generally address one or more of the problems of simulating defibrillating procedures.

The present apparatus and simulator are particularly well suited for training medical professionals to the use of any defibrillator available on the market (i.e. monophasic and biphasic). According to further aspects, the general public may also be trained to the use of an Automated External Defibrillator (AED), as it will become apparent below. For simplicity purposes, the term 'user' will be used herethrough to refer to both medical professionals and any person who use the present apparatus and simulator for training in defibrillating procedures.

As mentioned above, existing defibrillating simulators lack realism, as they work solely with specific defibrillators and rely on positioning of the electrodes on predetermined contact areas.

The present disclosure eliminates this disadvantage in providing an apparatus for adapting any defibrillator for training purposes, and enabling unrestricted electrode positioning on a surface on which an electric discharge is delivered.

Figure 1:
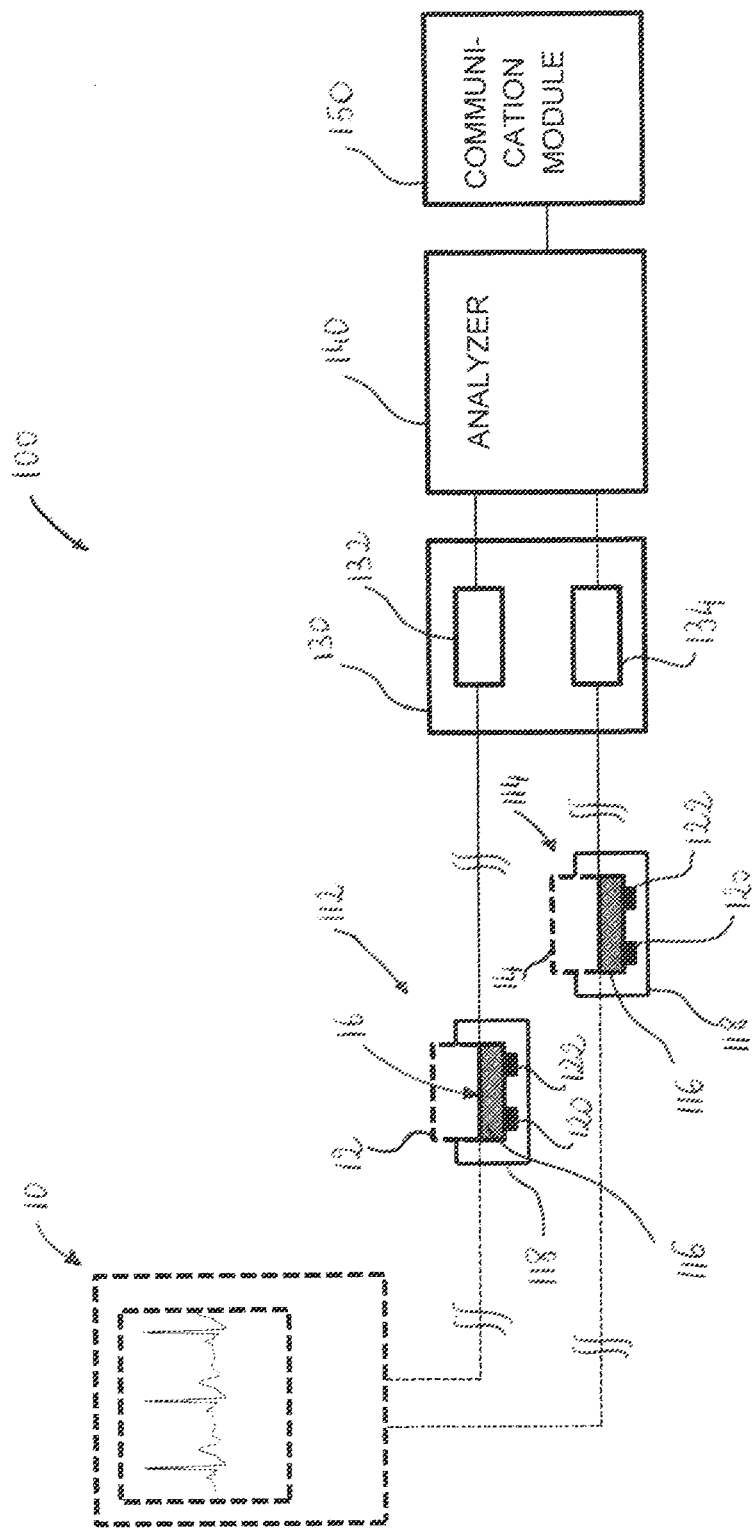
FIG. 1 is a schematic diagram of an apparatus for adapting a defibrillator for training.

Referring to FIG. 1, there is shown a schematic diagram of an example of an apparatus 100 for adapting a defibrillator 10 for simulation and training. The defibrillator 10 may be any defibrillator available on the market, and having a pair of electrodes 12, 14 for delivering an electrical discharge to a patient or mannequin (not shown). The electrical discharge may be a defibrillation discharge and/or a pacing discharge.

The apparatus 100 is provided with a pair of electrode covers 112, 114 to be affixed on electrodes 12, 14 of the defibrillator 10 for receiving an electrical discharge generated by the defibrillator 10 and delivered through the electrodes 12, 14. The term 'electrodes' in the present specification refers to any of the following: paddles, sticks, pads and patches. In the illustrated embodiment, each of the electrode covers 112, 114 comprises a conductive medium 116, for contacting an operating surface 16 of the electrodes 12 or 14, and an insulator 118. The electrode covers 112, 114, when affixed to the electrodes 12, 14 of the defibrillator 10, provide a conductive arrangement for receiving the electrical discharge generated by the defibrillator 10 through the electrodes 12, 14. The insulator 118 extends around the conductive medium 116 to fully electrically insulate the electrodes 12, 14 and electrically protect the users of the apparatus 100. The electrode covers 112, 114 and the insulator 118 may be affixed to the electrodes 12, 14 by any way known in the art that does not reduce the electrical insulation of the electrodes 12, 14.

For electrodes that are embodied as paddles or sticks, one or several pressure sensors 120 are embedded within the electrode covers 112, 114 for sensing a pressure applied by a user of the electrodes 12, 14 to a defibrillation surface. The pressure sensors 120 are embedded within the electrode covers 112, 114 in such a manner as to be electrically protected from the electrical discharge delivered by the electrodes 12, 14. The pressure sensors(s) 120 may for example be two positions sensors designed to sense the pressure applied by the user of the electrodes 12, 14 to the defibrillating surface in two distinct positions for each electrode 12, 14. Other pressure sensors 120 and arrangements thereof could also be considered to determine the pressure applied by the user of the electrodes 12, 14 on multiple positions of each paddle 12, 14, so as to ensure that the user of the electrodes 12, 14 uniformly applies pressure on the electrodes 12, 14 and identify during simulations potential risks such as damaged ribs or burned skin. The pressure detected by the pressure sensors 120 is communicated to an analyzer 140 which will be discussed further.

Position detectors 122 are also provided with each of the electrode covers 112, 114 for detecting a position of each one of the electrodes 12, 14 in space, or a relative position of the electrodes 12, 14 with respect to one another. The position detectors 122 may consist for example of a Global Positioning System receiver, or any type of wired or wireless position detection sensor, receiver, either passive or active, embedded in each conductive cover 112, 114, electrically protected from the electrical discharge delivered by the electrodes 12, 14, so as to monitor and report the detected position of the electrodes 12, 14, or the detected relative position of the electrode 12, 14 with respect to one another. The detected position or detected relative position is communicated to the analyzer 140. For simplicity purposes, the expression 'detected position' will be used hereinafter to refer to the one or both of the detected position and the detected relative position.

Although not particularly shown on FIG. 1, the electrode covers 112, 114 could further be equipped with an accelerometer to sense the movement of the electrodes 12, 14 in space, performed by the user when using the electrodes 12, 14 with the conductive convers 112, 114 installed thereon. The accelerometer provides the sensed movement of the electrodes 12, 14, to the analyzer 140.

The pressure sensors 120, the position detectors 122 and the accelerometer provide separately and/or combined important manipulation information about the use of the electrodes 12, 14 by the user to the analyzer 140, so as to allow the analyzer 140 to evaluate the performance of the user during a defibrillation training or simulation, and ultimately improve the user's skills when performing real-life defibrillation procedures.

The pressure sensors 120, the position detectors 122 and the accelerometer communicate either by wire connection with the analyzer 140, or wirelessly using any known communication protocol (such as for example Bluetooth™, WiFi, etc.) with a communication module 150 in electrical communication with the analyzer 140.

Each conductive medium 116 are electrically connected to an impedance 130. The impedance 130 may be located directly within the electrode covers 112, 114 (not shown on the Figures) or located within proximity of the analyzer 140 as shown on the Figures. The impedance 130 may be selected so as to simulate impedance of a human body. Alternatively, the impedance 130 is not specifically selected to simulate impedance of a human body, but rather to receive the electrical discharge and absorb and/or dissipate a portion of the electrical discharge. The electrical discharge generated by the defibrillator 10 is a high voltage discharge of several hundred Volts, and the impedance 130 generates an electrically reduced electrical discharge adapted to be handled by electronic components for further processing. The impedance 130 may for example consist of a pair a voltage reducing resistors 132, 134 serially connected with the conductive medium 116, or of any electrical component or group or electrical components electrically connected with the conductive medium 116 so as to reduce the electrical discharge generated by the defibrillator 10 by absorbing a portion of the delivered electrical discharge. A plurality of impedance values where each impedance value corresponds to a specific type of defibrillation (for example a baby, a young adult, an elderly, a thin person, an obese person . . . ) could also be provided together with a selection mechanism.

The analyzer 140 receives one or several of the following: the electrically reduced electrical discharge, the sensed pressure by the pressure sensors 120, the detected position from the position detectors 122 and the accelerator information. The analyzer 140 analyzes the electrically reduced electrical discharge generated by the impedance 130, the sensed pressure by the pressure sensors 120 and the position information from the position detectors 122 and generates corresponding analysis data. The analysis data includes one or several of the following information: the number of electrical discharges generated by the defibrillator 10 during a defibrillation training procedure or simulation, a duration of each electrical discharge delivered, a timeframe between each electrical discharge delivered, a power level of the generated electrical discharge delivered, a distance between the electrodes 12, 14 for each electrical discharge delivered, a movement of the electrodes 12, 14 between each electrical discharge delivered, pressure applied by the the electrodes 12, 14 onto a defibrillating surface, and if several impedances are present together with a selection mechanism, the impedance selected for each electrical discharge delivered.

The analyzer 140 may be implemented as hardware, software, firmware or combination thereof. For example, an electronics board with hardware circuits may be used for performing the analysis of the received signals. Alternatively, or concurrently, a processor may be used for receiving the electrically reduced electrical discharge or the characteristics thereof, the position detected by each of the position detectors 122, the pressure sensed by the pressure sensors 120, and the accelerometers data. The processor of the analyzer 140 executes software code which when executed analyzes characteristics of the electrically reduced electrical signal, the position detected, the pressure sensed and the movement collected by the accelerometers to generate the analysis data.

Figure 2:
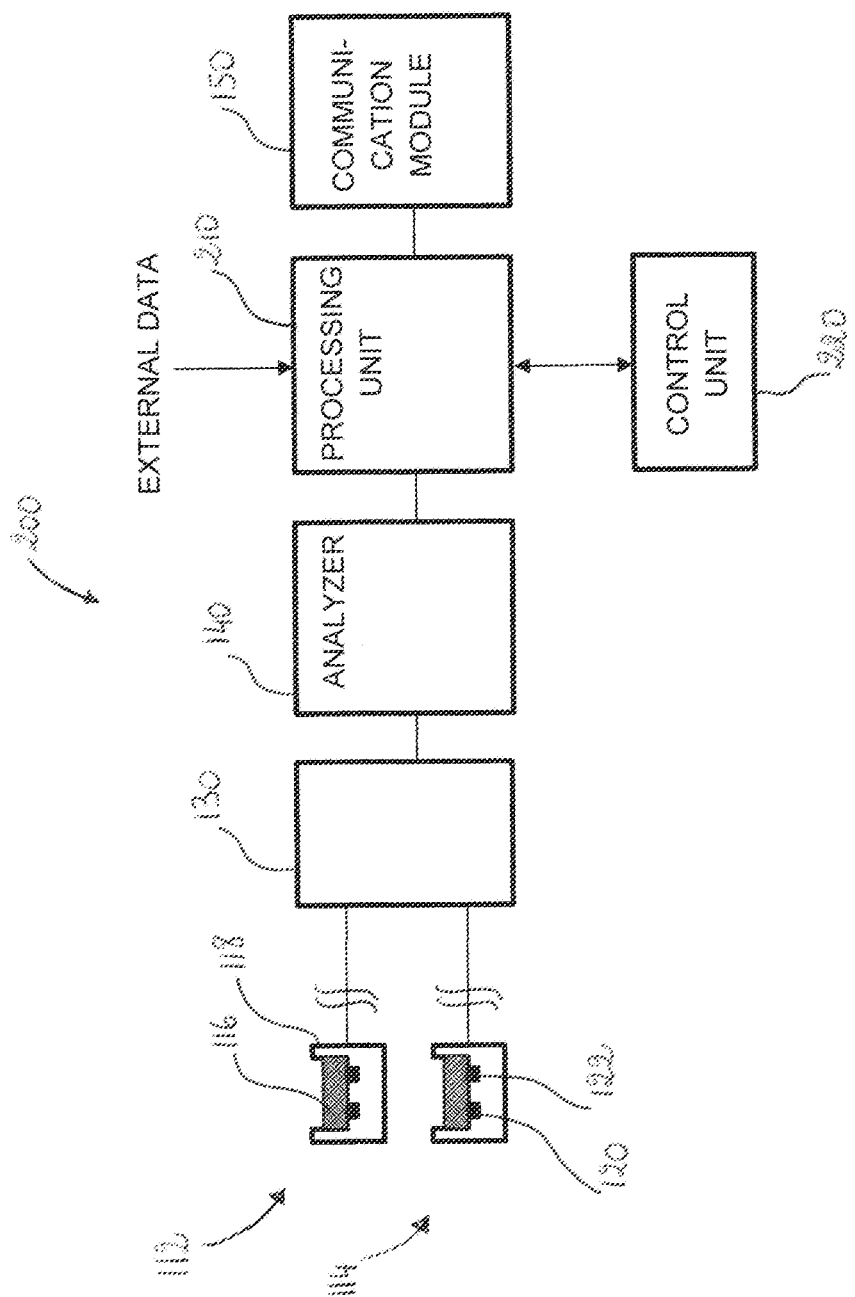
FIG. 2 is a schematic diagram of an apparatus for adapting a defibrillator for training adapted for receiving external data.

Reference is now made to FIG. 2, which shows an example of an apparatus 200 for adapting a defibrillator for training, which further comprises a processing unit 210 for receiving external data and a control unit 220. The external data may include expected value(s) or range(s) of expected value(s) for one or many of the following: the power of electrical discharge, the duration of the electrical discharge, the delay between the electrical discharges, the sensed pressure, the detected position, the movement of the electrodes 12, 14, etc.

The external data is received directly by the processing unit 210 (shown on FIG. 2) or through the communication module 150 (not shown on FIG. 2 for simplicity purposes). The processing unit 210 further receives the analysis data from the analyzer 140 and correlates the analysis data with the external data. More particularly, the processing unit 210 compares the analysis data with the external data to identify whether the defibrillating procedure is performed within the expected value(s) or range(s). When the defibrillating procedure is performed within the expected value(s) or range(s), the processing unit 210 instructs the control unit 220 to pursue with the defibrillating procedure. When the defibrillating procedure is not performed within the expected value(s) or range(s), the processing unit 210 instructs the control unit 220 to inform the user of the electrodes 12, 14 of the aspects of the procedure which were not performed within the expected value(s) or range(s). The control unit 220 may further provide recommendations to the user of the electrodes 12, 14 to improve the way the electrodes 12, 14 are used to perform the defibrillating procedure. The processing unit 210 and the control unit 220 may be co-located with the analyzer 140 and the communication module 150 or part of a separate electronic device, such as a PC or a tablet electrically or wirelessly connected to the analyzer 140. The processing unit 210 and the control unit 220 may be co-located with the analyzer 140, or embodied by a separate computer, tablet or smart phone in electronic or wireless communication with the analyzer 140.

Figure 3:
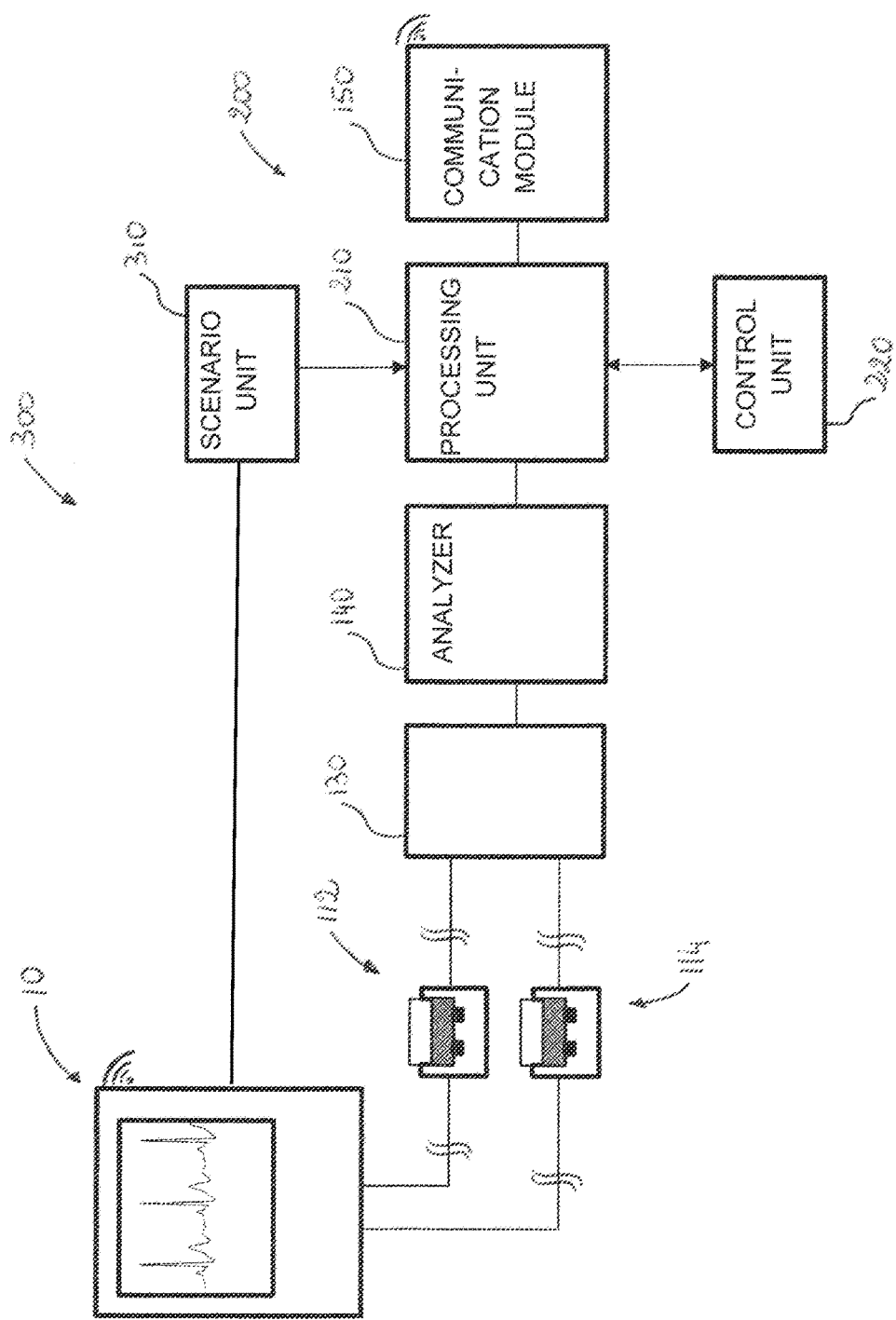
FIG. 3 is a schematic diagram of a defibrillating simulator.

Referring now to FIG. 3, there is shown a schematic diagram of an example of a defibrillating simulator 300. In FIG. 3, the defibrillating simulator 300 is provided with the apparatus 200 for adapting a defibrillator as illustrated in FIGS. 1 and 2. The defibrillating simulator 300 further comprises a scenario unit 310 for providing at least one training scenario and corresponding physiological model. The physiological model comprises a simulated electrocardiogram signal including waveform shape, frequency and amplitude corresponding to a beating heart. The physiological model is provided to the defibrillator 10 for display thereon and to the processing unit 210 as external data.

The scenario unit 310 is adapted for simulating any type of heart condition or defibrillating event such as a ventricular fibrillation or a ventricular tachycardia as non-limitative examples, heart conditions for which a user needs to perform a defibrillating procedure. The scenario unit 310 comprises a memory for storing a plurality of training scenarios, each training scenario corresponding to a heart condition or defibrillating event. The memory may consist of any type of memory used in electronic products, such as for example Random Access Memory, Read Only Memory, flash memory, etc. Although not shown on FIG. 3, the scenario unit 310 may further comprise processing capability, an input/output module for electronically or wirelessly communicating with the defibrillator 10, the processing unit 210, the analyzer 140 and the communication module 150. The input/output module of the scenario unit 310 may further provide communication with an electronic device, such as for example a computer, a tablet or a smart phone to allow an instructor to select a training scenario or modify a training scenario to be generated by the scenario unit 310, and forwarded to the processing unit 210 and the defibrillator 10. The scenario unit 310 may be co-located with the analyzer 140, co-located with the processing unit 210 or physically separated there from.

The processing unit 210 receives the training scenario. The processing unit 210 correlates the analysis data with the training scenario to provide training results for subsequent display on a screen of the defibrillator 10 or on a display (not shown) of the defibrillating simulator 300. In one exemplary embodiment, the training scenario comprises an abnormal event requiring a predetermined procedure. Corresponding physiological data, such as for example an electrocardiogram data, are displayed to the user of the defibrillating simulator 300 either through the defibrillator 10 display, or through a separate display (not shown). The user of the defibrillating simulator 300 performs the defibrillating procedure by positioning the electrodes 12, 14 against the surface to be defibrillated (e.g. a mannequin, a standardized patient, or a virtual patient), exercises a pressure against the surface to be defibrillated, and actuates electrical discharge by the electrodes 12, 14. The electrical discharge generated by the electrodes 12, 14 is collected by the conductive medium 116 of the electrode covers 112 and 114 and electrically conducted to the impedance 130. The impedance 130 generates a corresponding electrically reduced electrical discharge that is analyzed in the analyzer 140. The analyzer 140 further receives the pressure sensed by the pressure sensors 120 and the position of the electrodes 12, 14 determined by the position detectors 122, analyzes the received electrically reduced electrical discharge, the pressure sensed, the position of the electrodes 12, 14 and generates therefor the analysis data. The analyzer 140 forwards the analysis data to the processing unit 210 which compares the analysis data with the training scenario. In the case where the electrically reduced electrical discharge, the pressure sensed and the position of the electrodes correspond to a range of acceptable values for the training scenario, the processing unit 210 provides successful training results for display to the user either on the defibrillator 10 or on a separate display (not shown) of the simulator 300. For example, the successful training results is a normal electrocardiogram signal displayed on the display of the defibrillator 10. The user of the simulator 300 is hence confirmed that the defibrillating procedure was successful. In the event of an insufficient electrical discharge or absence thereof, and/or the pressure sensed and/or the position and/or the movement of the electrodes 12, 14 do not correspond to acceptable values for the training scenario, the processing unit 210 provides training results for display to the user that indicate that the defibrillating procedure was not successful or not performed properly.

Once a simulation has been started through the scenario unit 310, the scenario unit 310 forwards to the defibrillator 10 virtual electrocardiogram signal to be displayed. The user of the simulator 300 monitors the virtual electrocardiogram signal displayed and operates the defibrillator 10 in a manner very similar to a real defibrillating procedure. Upon operation of the defibrillator 10 by the user, the training results are displayed on the defibrillator 10.

The defibrillator simulator 300 may be used independently, or with a mannequin simulating various physiological functions of a human body. When the defibrillator simulator 300 is used with a mannequin, the control unit 320 is in communication with the mannequin so as to control the mannequin in accordance with the simulated defibrillation procedure.

In the present disclosure, contrary to what is proposed in the prior art, the means for detecting the generated discharge is embedded in an electrically isolated closed loop circuit. This is of great advantage for reducing risks of potential high voltage shocks when the user interacts with the mannequin for other simulation purposes such as a cardiopulmonary resuscitation (CPR) simulation for example. The present disclosure also enables to simplify the design of a mannequin devised for healthcare simulation since the required components have not to be installed inside such mannequin.

Although the present disclosure has been described hereinabove by way of non-restrictive, illustrative embodiments thereof, these embodiments may be modified at will within the scope of the appended claims without departing from the present claims.

What is claimed is:

1. A defibrillating simulator comprises:
   an apparatus for adapting a defibrillator for training, the apparatus comprising:
   a pair of electrode covers to be mounted on electrodes of the defibrillator for receiving an electrical discharge generated by the defibrillator delivered through the electrodes, each of the electrode covers comprising an insulator and a conductive medium, the insulator extending around the conductive medium to fully electrically insulate the electrodes;
   an impedance connected to the conductive medium of the pair of electrode covers to receive therethrough the electrical discharge and absorb some of the electrical discharge to generate an electrically reduced electrical discharge;
   an analyzer for analyzing the electrically reduced electrical discharge and providing analysis data representative of the electrical discharge;
   a scenario unit for providing at least one training scenario comprising physiological data; and
   a processing unit for receiving the training scenario and the analysis data, the processing unit for correlating the analysis data with the training scenario to generate training results.

2. The defibrillating simulator of claim 1, wherein the processing unit further receives external data.

3. The defibrillating simulator of claim 2, further comprising a control unit for controlling a mannequin on which the defibrillator is used.

4. The defibrillating simulator of claim 1, wherein the analysis data comprise at least one of the following: a number of electrical discharges generated, a duration of each electrical discharge delivered, a timeframe between each electrical discharge delivered, and a power level of the generated electrical discharge delivered.

5. The defibrillating simulator of claim 1, wherein the conductive medium contacts an operating surface of the electrode.

6. The defibrillating simulator of claim 1, wherein each of the electrode covers further comprises a pressure sensor for sensing a pressure applied to a simulated defibrillation surface.

7. The defibrillating simulator of claim 1, wherein each of the electrode covers further comprises a position detector for detecting a relative position of the corresponding electrode.

8. The defibrillating simulator of claim 7, wherein the position detectors comprise one of an accelerometer and a Global Positioning System.

9. The defibrillating simulator of claim 8, wherein the processing unit and the scenario unit are implemented in a portable computer.

10. The defibrillating simulator of claim 9, further comprising a communication module to communicate the physiological data and the training results to the defibrillator for display thereon.

11. The defibrillating simulator of claim 10, wherein the defibrillator is a manual defibrillator requiring a user action for generating the electrical discharge.

12. The defibrillating simulator of claim 8, further comprising position detectors and pressure sensors mounted with the electrode covers for detecting suitable relative positioning of the electrodes.

13. The defibrillating simulator of claim 1, further comprising a display for displaying the training results.

14. The defibrillating simulator of claim 1, wherein the impedance is co-located with the electrode covers.

15. The defibrillating simulator of claim 1, wherein the communication module communicates wirelessly.

* * * * *